(12) United States Patent
Shalom et al.

(10) Patent No.: US 6,201,541 B1
(45) Date of Patent: Mar. 13, 2001

(54) SYSTEM AND METHOD FOR "STITCHING" A PLURALITY OF RECONSTRUCTIONS OF THREE-DIMENSIONAL SURFACE FEATURES OF OBJECT(S) IN A SCENE DEFINED RELATIVE TO RESPECTIVE COORDINATE SYSTEMS TO RELATE THEM TO A COMMON COORDINATE SYSTEM

(75) Inventors: Tamir Shalom, Tel Aviv; Ilan Zelnik, Matan; Jacob Goldberger, Givat-Shmuel, all of (IL)

(73) Assignee: CogniTens, Ltd., Ramat Hasharon (IL)

( * ) Notice: Subject to any disclaimer, the term of this patent is extended or adjusted under 35 U.S.C. 154(b) by 0 days.

(21) Appl. No.: 09/165,687

(22) Filed: Oct. 2, 1998

Related U.S. Application Data

(63) Continuation-in-part of application No. 08/989,047, filed on Dec. 11, 1997.

(51) Int. Cl.[7] .................................................. G06T 15/00
(52) U.S. Cl. .......................... 345/419; 382/154; 382/284
(58) Field of Search ..................................... 345/419, 420, 345/425, 427, 433, 434, 435, 436, 437, 438; 382/154, 284

(56) References Cited

U.S. PATENT DOCUMENTS

| | | | |
|---|---|---|---|
| 5,598,515 | * | 1/1997 | Shashua ................................ 395/122 |
| 5,818,959 | * | 10/1998 | Webb et al. ......................... 382/154 |
| 5,821,943 | * | 10/1998 | Shashua ................................ 345/427 |

FOREIGN PATENT DOCUMENTS

| | | | |
|---|---|---|---|
| 96/34365 | * | 7/1998 | (WO) ............................ G06T/17/40 |
| 98/27514 | * | 7/1998 | (WO) ............................ G06T/17/40 |

* cited by examiner

*Primary Examiner*—Mark R. Powell
*Assistant Examiner*—Enrique L. Santiago
(74) *Attorney, Agent, or Firm*—Richard A. Jordan

(57) ABSTRACT

A system is disclosed for stitching a plurality of reconstructions of three-dimensional surface features of at least one object in a scene to relate the reconstructions to a common coordinate system. Each reconstruction is generated from a plurality of two-dimensional images of the scene, and each reconstruction is defined relative to a respective one of a plurality of reconstruction coordinate systems defined relative to one of the images in the scene. The system generates, from at least some of the images, values for translational and rotational components relating a respective reconstruction coordinate system to the common coordinate system. Thereafter, the system uses the values of the translational and rotational components to convert coordinates of the surface features in the respective reconstruction coordinate systems to the common coordinate system. In embodiments of the system, the common coordinate system is selected to be one of the reconstruction coordinate systems, and the values for translational and rotational components relating the other reconstruction coordinate system(s) to the common coordinate system uses overlapping regions of the images which define the respective reconstruction coordinate systems. In those embodiments, the system first determines the dominate translation that best aligns the largest portions of the image which defines the common coordinate system and the other images, shifts the other images by the amount of the dominate translation and then generates a pixel-to-pixel correspondence to generate a displacement field. From the dominate translation and the displacement field, the system generates the values for the translational and rotational components.

57 Claims, 7 Drawing Sheets

100. IMAGE PROCESSOR 15 DETERMINES, FOR A SET OF POINTS ON THE SURFACE(S) OF THE RESPECTIVE OBJECT(S) IN THE SCENE 14, COORDINATES OF EACH OF THE POINTS IN BOTH THE COORDINATE SYSTEM BEFORE THE ILLUSTRATIVE MOVEMENT AND THE COORDINATE SYSTEM AFTER THE ILLUSTRATIVE MOVEMENT

↓

101. IMAGE PROCESSOR USES THE COORDINATES IN THE TWO COORDINATE SYSTEMS TO RELATE THE COORDINATE SYSTEM AFTER THE ILLUSTRATIVE MOVEMENT TO THE COORDINATE SYSTEM BEFORE THE ILLUSTRATIVE MOVEMENT 18, TO DETERMINE THE VALUES OF THE TRANSLATIONAL AND ROTATIONAL COMPONENTS COMPRISING THE ILLUSTRATIVE MOVEMENT

↓

102. IMAGE PROCESSOR 15 USES THE VALUES FOR THE TRANSLATIONAL AND ROTATIONAL COMPONENTS FOR THE ILLUSTRATIVE MOVEMENT TO CONVERT THE COORDINATES OF THE POINTS WHICH ARE DEFINED IN COORDINATE SYSTEM AFTER THE ILLUSTRATIVE MOVEMENT TO THE COORDINATE SYSTEM BEFORE THE ILLUSTRATIVE MOVEMENT

120. FOR AN IMAGE 20(B)(C), THE IMAGE PROCESSOR 15 DETERMINES THE DOMINANT TRANSLATION (UD,VD) THAT BEST ALIGNS THE LARGEST PORTIONS OF IMAGE 20(A)(0) AND THE RESPECTIVE IMAGE 20(B)(C)

121. IMAGE PROCESSOR 15 SHIFTS THE RESPECTIVE IMAGE 20(B)(C) BY SHIFTING THE COORDINATES OF THE POINTS OF THE RESPECTIVE IMAGE 20(B)(C) BY THE DOMINANT TRANSLATION (UD,VD) TO CREATE A RESPECTIVE SHIFTED IMAGE 20(B')(C)

122. IMAGE PROCESSOR 15 GENERATES A PIXEL-TO-PIXEL CORRESPONDENCE BETWEEN IMAGE 20(A)(0) AND THE RESPECTIVE SHIFTED IMAGE 20(B')(C), THE PIXEL-TO-PIXEL CORRESPONDENCE DEFINING A DISPLACEMENT FIELD (UP(X,Y),VP(X,Y)) THAT IDENTIFIES THE DISPLACEMENT, FROM LOCATION (X,Y) OF THE POINT IN THE IMAGE 20(A)(0), TO THE LOCATION (X+UP(X,Y),Y+VP(X,Y)) OF THE CORRESPONDING POINT IN THE RESPECTIVE SHIFTED IMAGE 20(B')(C)

130. IMAGE PROCESSOR 15 DETERMINES AN AVERAGE FOR EACH OF THE SETS OF POINTS PJ AND QJ, REFERRED TO AS P' AND Q', RESPECTIVELY.

131. IMAGE PROCESSOR 15 GENERATES NEW SETS OF POINTS {PJ-P'}J AND {QJ-Q'}J

132. IMAGE PROCESSOR 15 GENERATES THE VALUE FOR THE ROTATIONAL COMPONENT R USING THE NEW SETS OF POINTS {PJ-P'}J AND {QJ-Q'}J GENERATED IN STEP 131

133. IMAGE PROCESSOR 15 GENERATES THE VALUE FOR THE TRANSLATIONAL COMPONENT "T" AS Q'-RP'

*FIG. 4*

150. IMAGE PROCESSOR 15 DETERMINES THE INITIAL SET OF TRANSFORMATIONS USING POINTS WHICH ARE PROJECTED INTO ALL OF THE IMAGES 20(A)(0), 20(B)(0),... WHICH DEFINE THE RESPECTIVE COORDINATE SYSTEMS ASSOCIATED WITH THE RESPECTIVE SETS OF IMAGES 20(A)(c), 20(B)(c),..., WITH THE TRANSFORMATION SET ASSOCIATED WITH IMAGE 20(A)(0) BEING FORCED TO THE IDENTITY TRANSFORMATION

151. IMAGE PROCESSOR 15 PERFORMS, FOR EACH IMAGE 20(A)(0), 20(B)(0),..., THE ESTIMATION PHASE TO GENERATE A NEW MAXIMUM LIKELIHOOD ESTIMATE OF THE COORDINATES OF RESPECTIVE POINTS IN THE SCENE 14 (REFERENCE EQUATION (11))

152. IMAGE PROCESSOR 15 GENERATES, FOR EACH IMAGE 20(A)(0), 20(B)(0),..., A COVARIANCE MATRIX (REFERENCE EQUATIONS (12) THROUGH (14))

153. IMAGE PROCESSOR 15 DETERMINES THE SINGULAR VALUE DECOMPOSITION FOR EACH COVARIANCE MATRIX (A)

*FIG. 5*

SYSTEM AND METHOD FOR "STITCHING" A PLURALITY OF RECONSTRUCTIONS OF THREE-DIMENSIONAL SURFACE FEATURES OF OBJECT(S) IN A SCENE DEFINED RELATIVE TO RESPECTIVE COORDINATE SYSTEMS TO RELATE THEM TO A COMMON COORDINATE SYSTEM

CROSS REFERENCE TO RELATED PATENT APPLICATION

This application is a continuation in part of U.S. patent application Ser. No. 08/989,047, filed Dec. 11, 1997, in the names of Dan Albeck, et al., and entitled "Apparatus And Method For 3-Dimensional Surface Geometry Reconstruction," assigned to the assignee of this application

INCORPORATION BY REFERENCE

U.S. patent application Ser. No. 08/497,224, filed Jun. 30, 1995, in the name of Amnon Shashua, and entitled "Apparatus And Method For Recreating And Manipulating A 3D Object Based On A 2D Projection Thereof," assigned to the assignee of this application, incorporated by reference.

U.S. patent application Ser. No. 08/989,047, filed Dec. 11, 1997, in the names of Dan Albeck, et al., and entitled "Apparatus And Method For 3-Dimensional Surface Geometry Reconstruction," assigned to the assignee of this application, incorporated by reference.

FIELD OF THE INVENTION

This application relates generally to the field of reconstructing and/or manipulating surface geometries of one or more three dimensional objects in a scene, from a plurality of two dimensional images of the scene. The application more particularly relates to reconstruction and manipulation of such surface geometries of the object(s) as determined from a plurality of sets of two-dimensional images, each image set facilitating the reconstruction and/or manipulation of a predetermined portion of the surface geometries of the object(s) in the scene, with the plurality of image sets facilitating the reconstruction and/or manipulation of respective portions of the surface geometries of the object(s) in the scene.

BACKGROUND OF THE INVENTION

Reconstruction and/or manipulation (generally, "reconstruction") of surface features of three-dimensional object(s) in a scene, from a plurality of two-dimensional images of the object(s), is useful in a number of applications. U.S. patent application Ser. No. 08/989,047, filed Dec. 11, 1997, in the names of Dan Albeck, et al., and entitled "Apparatus And Method For 3-Dimensional Surface Geometry Reconstruction" (hereinafter referred to as the "Albeck application") describes an apparatus for performing such reconstruction using a rig of three cameras, using a tensor arrangement described in U.S. patent application Ser. No. 08/497,224, filed Jun. 30, 1995, in the name of Amnon Shashua, and entitled "Apparatus And Method For Recreating And Manipulating A 3D Object Based On A 2D Projection Thereof" (hereinafter referred to as the "Shashua application") to generate information regarding reconstruction for the features of the object(s) from three images generated by the cameras. In the arrangement described in the Shashua application, the surface features that are reconstructed are defined by points that have coordinates in a coordinate system relative to one of the cameras in the rig.

A problem arises in reconstruction if the surface features that are to be reconstructed cannot all be recorded by all of the cameras with the rig in one position. The apparatus described in the Albeck application provides a mechanism for moving the rig so as to allow the cameras to record sets of images of various portions of the surface(s) of the object(s). However, when the rig moves from one location, in which the cameras record a set of images of one portion of the object(s), to another location, in which the cameras record another set of images of another portion of the object(s), the coordinate system for the points defining the surface features of the various portions of the object(s) also changes.

In order to utilize the reconstruction information generated in the two coordinate systems in a unitary manner in connection with the object(s) in the scene, it is necessary to relate the coordinate systems to a common coordinate system, which will allow all of the points of the various portions of the reconstructed object(s) to be related to the common coordinate system, effectively "stitching" the reconstructions together. The common coordinate system can conveniently be one of the two coordinate systems used in reconstruction, or it can be a third coordinate system, but in any case all of the points for the various portions of the reconstructed object need to be related to a common coordinate system. When a rig, such as the rig described in the Albeck application is moved from one position to another, to facilitate recording of sets of images of different portions of the object(s), the movement comprises one or both of a translation and a rotation of the rig, both in three dimensions. If the translational and rotational movement of the rig can be controlled sufficiently precise, the relation of the coordinate system after movement to the coordinate system before movement can easily be determined. However, if, for example, the mass of the rig is sufficiently large, in a number of applications the movement of the rig cannot readily be controlled sufficiently precisely to allow sufficiently precise reconstruction.

SUMMARY OF THE INVENTION

The invention provides new and improved systems and methods for "stitching" a plurality of reconstructions of three-dimensional surface features of object(s) in a scene, the reconstructions being defined relative to respective coordinate systems, thereby to relate them to a common coordinate system.

In brief summary, the invention provides a system disclosed for stitching a plurality of reconstructions of three-dimensional surface features of at least one object in a scene to relate the reconstructions to a common coordinate system. Each reconstruction is generated from a plurality of two-dimensional images of the scene, and each reconstruction is defined relative to a respective one of a plurality of reconstruction coordinate systems defined relative to one of the images in the scene. The system generates, from at least some of the images, values for translational and rotational components relating a respective reconstruction coordinate system to the common coordinate system. Thereafter, the system uses the values of the translational and rotational components to convert coordinates of the surface features in the respective reconstruction coordinate systems to the common coordinate system.

In embodiments of the system, the common coordinate system for simplicity is selected to be one of the reconstruction coordinate systems, and the values for translational and rotational components relating the other reconstruction coordinate system(s) to the common coordinate system uses overlapping regions of the images which define the respective reconstruction coordinate systems. In those embodiments, the system first determines the dominate translation that best aligns the largest portions of the image which defines the common coordinate system and the other images, shifts the other images by the amount of the dominate translation and then generates a pixel-to-pixel correspondence to generate a displacement field. From the dominate translation and the displacement field, the system generates the values for the translational and rotational components.

In embodiments of the system, for multiple reconstructions, instead of processing successive pairs of sets of images to determine translational and rotational components associated with respective reconstruction coordinate systems, the system makes use of a statistical methodology, identified as the "E–M" (estimation and maximization) methodology, to generate maximum likelihood estimates of the translational and rotational components associated with the relations between the reconstructin coordinate systems and the common coordinate system.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2 through 5 are flowcharts depicting operations performed by the system depicted in FIG. 1 in connection with the invention.

DETAILED DESCRIPTION OF AN ILLUSTRATIVE EMBODIMENT

Figure 1:
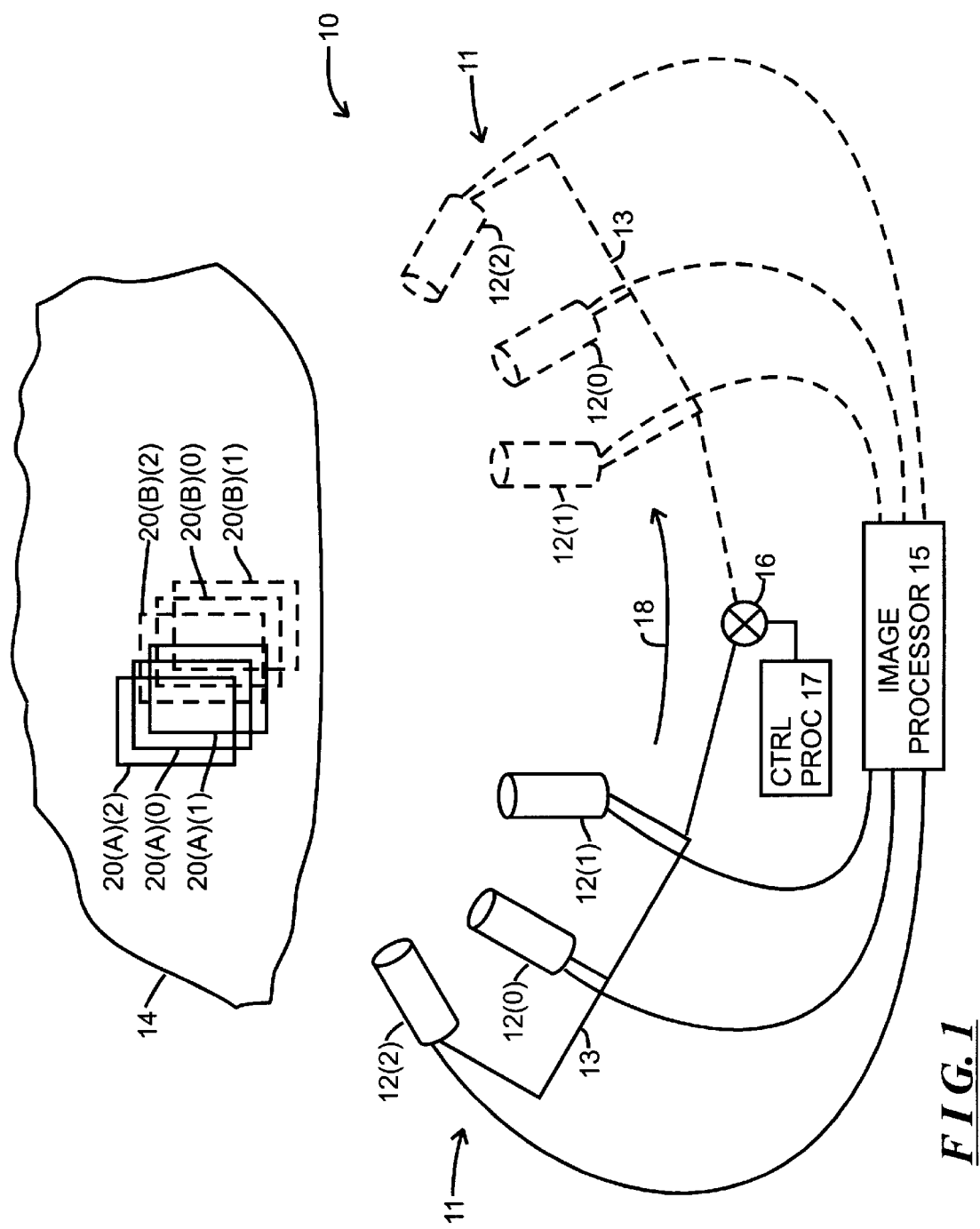
FIG. 1 is a diagram of a system for "stitching" a plurality of reconstructions of three-dimensional surface features of object(s) in a scene defined relative to respective coordinate systems to relate them to a common coordinate system, constructed in accordance with the invention.

FIG. 1 is a diagram of a system 10 for "stitching" a plurality of reconstructions of three-dimensional surface features of object(s) in a scene defined relative to respective coordinate systems to relate them to a common coordinate system, constructed in accordance with the invention. With reference to FIG. 1, system 10 includes a rig 11 including a plurality of cameras 12(0) through 12(C) (generally referred to by reference numeral 12(c)) mounted on a common support 13. The cameras 12(c) are preferably focused on generally the same portion of a scene, including the same portion(s) of the surface(s) of one or more objects generally identified by reference numeral 14 in the scene, thereby to facilitate recording of a set of two-dimensional images of the respective portion(s) by the respective cameras 12(c). The cameras 12(c) provide the set of recorded images to an image processor 15 which generates, from the images provided thereto by the cameras 12(c), information relating to a three-dimensional reconstruction of surface features of the respective object(s) 14 in the scene, for the respective portion(s) to which the cameras 12(c) are focused. In one embodiment, the rig 11 and cameras 12(c) are similar to the respective elements of the apparatus described in the aforementioned Albeck application. In that embodiment, the cameras 12(c) preferably include CCD ("charge-coupled device") image recording devices, which provide image information in digital form to the image processor 15 for processing. In addition, in that embodiment, the image processor 15 includes suitably-programmed computing devices (such as a suitably-programmed general purpose computer) which generates the three-dimensional surface information from the set of two-dimensional images in a manner similar to that described in the aforementioned Shashua application.

The system 10 is further provided with a motor 16 which, under control of a control processor 17, can move the rig 11 to facilitate direction of the cameras 12(c) to another portion of the scene 14, including respective other portion(s) of the surface(s) of respective object(s) in the scene 14 from which position the cameras 12(c) can record a second set of images. The rig 11 before one such illustrative movement, indicated in FIG. 1 by the arrow associated with reference numeral 18, is depicted in solid lines in FIG. 1, and rig 11 after the illustrative movement 18 depicted in dashed lines in FIG. 1. In addition, the set of images recorded by the respective cameras 12(c) prior to the illustrative movement 18 of rig 11 is represented by images 20(A)(0) through 20(A)(C) (generally identified by reference numeral 20(A)(c)), and the set of images recorded by the respective cameras 12(c) after the illustrative movement 18 of rig 11 is represented by images 20(B)(0) through 20(B)(c) (generally identified by reference numeral 20(B)(c)). The respective sets of images 20(A)(c) and 20(B)(c) are preferably not of coincident portions of the surface(s) of the object(s) 14 in the scene. Instead, the sets of images 20(A)(c) and 20(B)(c) will preferably be of different portions of the respective surface (s), but, as will be described below, the portions of the respective surface(s) represented by the sets of images 20(A)(c) and 20(B)(c) preferably overlap to some extent.

The image processor 15 processes the images 20(A)(c) provided by the cameras 12(c) prior to the illustrative movement 18 to generate the three-dimensional surface information relating to the portion(s) of the object(s) depicted by the images 20(A)(c). In addition, the image processor 15 processes the images 20(B)(c) provided by the cameras 12(c) after the illustrative movement 18 to generate the three-dimensional surface information relating to the portion(s) of the object(s) depicted by images 20(B)(c). In one embodiment, operations performed by the image processor 15 in generating the three-dimensional surface information, in connection with the images recorded both before and after the illustrative movement 18, correspond to those operations described in the aforementioned Shashua application, and the information so generated may represent a three-dimensional reconstruction of the portion(s) of the object(s) depicted in the respective set of images. In that embodiment, the image processor 15 generates, from a plurality of sets of points $p_j$, $p_j'$ and $p_j''$ ("j" being an index) in images 20(A)(0) through 20(A)(2), respectively, with points $p_j$, $p_j'$ and $p_j''$ in each set corresponding to projections of a point $P_j$ on a surface of an object in the scene 14 onto the respective images 20(A)(0) through 20(A)(2), a tensor $T_A$. In generating the tensor $T_A$, the image processor 15 uses two-dimensional coordinates, in the respective images 20(A)(c), of a selected number of sets of respective points $p_j$, $p_j'$ and $p_j''$. As described in the Shashua application, seven sets of points $p_j$, $p_j'$ and $p_j''$ will suffice to enable the image processor 15 to generate the tensor $T_A$. As also described in the Shashua application, using the tensor $T_A$ and two-dimensional coordinates of any set of points $p_j$, $p_j'$ and $p_j''$ in the images 20(A)(c) which are projections of a point $P_j$ (including, but not limited to, the seven sets of points used to generate the tensor $T_A$), the image processor 15 can determine the three-dimensional coordinates of the corresponding point $P_j$ in the scene 14. The three dimensional coordinates of point $P_j$ will be in a coordinate system relative to one of the images 20(A)(c), illustratively the image 20(A)(0) recorded by camera 12(0) before the illustrative movement 18.

Similarly, the image processor generates, from coordinates a plurality of points $q_j$, $q_j'$ and $q_j''$ to in images 20(B)(0) through 20(B)(2), respectively, all corresponding to projections of respective points $Q_j$ onto the respective images 20(B)(0) through 20(B)(2), a tensor $T_B$ and coordinates for the respective points $Q_j$ in a coordinate three-dimensional coordinate system relative to one of the images, illustratively image 20(B)(0), recorded by camera 12(0) after the illustrative movement 18. If the rig 11 is rigid under the movement, so that the cameras 12(c) will be in the same positions relative to each other before and after the illustrative movement 18, and if the three-dimensional coordinate systems are relative to images recorded by the same camera 12(0), then the tensor $T_B$ will correspond to the tensor $T_A$. In the following, it will be assumed that the rig 11 is rigid under movement, so that the same tensor can be used both before and after the illustrative movement 18.

As noted above, the coordinates generated by the image processor 15 for points $P_j$ generated using images 20(A)(c) are defined relative to a three-dimensional coordinate system associated with one of the cameras 12(c), for example, camera 12(0), in its position, prior to the illustrative movement 18, at which image 20(A)(0) was recorded, and coordinates generated by the image processor 15 for points $Q_j$ from images 20(B)(c) are defined relative to a coordinate system that is preferably associated with the same camera 12(0), but which will be relative to the camera's position after the illustrative movement 18 at which image 20(B)(0) was recorded. In each case, the coordinates will be defined relative to two coordinate axes (illustratively referred to herein as "x" and "y" axes") which correspond to the plane of the respective image 20(A)(0) and 20(B)(0), and a third axis (illustratively referred to herein as a "z" axis) that is transverse thereto. It will be appreciated that the coordinate systems for the two sets of points $P_j$ and $Q_j$ in the scene 14 will differ. To be able to utilize both sets of points in a unitary fashion, it is desirable to associate them both with a common coordinate system. The particular common coordinate system which is selected is not important, and, for simplicity and without loss of generality, it (that is, the common coordinate system) can be selected to be the coordinate system before the illustrative movement 18 or after the illustrative movement 18. In one embodiment, the common coordinate system is selected to correspond to the coordinate system associated with camera 12(0) prior to the illustrative movement 18. Thus, in processing the images 20(B)(c) which are recorded after the illustrative movement 18, the image processor 15 will relate the coordinates of the points in three dimensional space that are recorded by the cameras 12(c) after the illustrative movement 18, to the coordinate system associated with camera 12(0) prior to the illustrative movement 18.

Generally, the change in coordinate system resulting from the illustrative movement 18 consists of one or both of a translational component and/or a rotational component, both in three dimensional space. Thus, if the coordinate system associated with camera 12(0), both before and after the illustrative movement 18, has an origin at the center of the image plane of the camera 12(0), the translational component comprises the position of the center of the image plane after the illustrative movement 18, in the coordinate system associated with the camera 12(0) before the illustrative movement 18. In addition, the rotational component corresponds to the angle of the image plane after the illustrative movement 18, relative to the image plane before the illustrative movement 18. It will be appreciated that, if the position of the origin after the illustrative movement 18 corresponds to the position of the origin before the illustrative movement 18, there is no translational component for the illustrative movement 18. Similarly, if the angular position of the coordinate axes after the illustrative movement 18 corresponds to the angular position of the coordinate axes before the illustrative movement 18, there is no rotational component for the illustrative movement 18.

It will be appreciated that, if the position and angular orientation of the rig 11 before and after the illustrative movement 18 can be controlled or determined (by, for example, mechanical or electronic sensors) to a sufficient degree of accuracy they (that is, the position and angular orientation) can be used to define the translational and rotational components to relate the coordinate system after the illustrative movement 18 to the coordinate system before the illustrative movement 18. However, in one embodiment, to provide a higher degree of accuracy, the image processor 15 uses the overlapping portions of the respective sets of images 20(A)(c) and 20(B)(c) to determine the translational and rotational components comprising the illustrative movement 18, thereby to relate the coordinate system associated with points $Q_j$ to the common coordinate system, so that all points $P_j$ and $Q_j$ will be in the same coordinate system, namely, the common coordinate system defined relative to image 20(A)(0).

Operations performed by the image processor 15 in determining the translational and rotational components comprising the illustrative movement 18 will be described in connection with flowcharts depicted in FIGS. 2 through 4. Generally, using operations described below in connection with FIGS. 2 through 4, the image processor 15 identifies the coordinates, in the coordinate system after the illustrative movement 18, of a number of points $Q_j$ in the scene 14 as recorded in images 20(B)(c) after the illustrative movement 18, which correspond to points $P_j$ in the coordinate system before the illustrative movement 18 as recorded in images 20(A)(c). Since the points $Q_j$ and $P_j$ are, in fact, the same points in the scene 14, although defined in relation to different coordinate systems, the image processor 15 can determine the relationships between the two coordinate systems to, in turn, determine the values for the translational and rotational components comprising the illustrative movement 18.

Figure 5A:
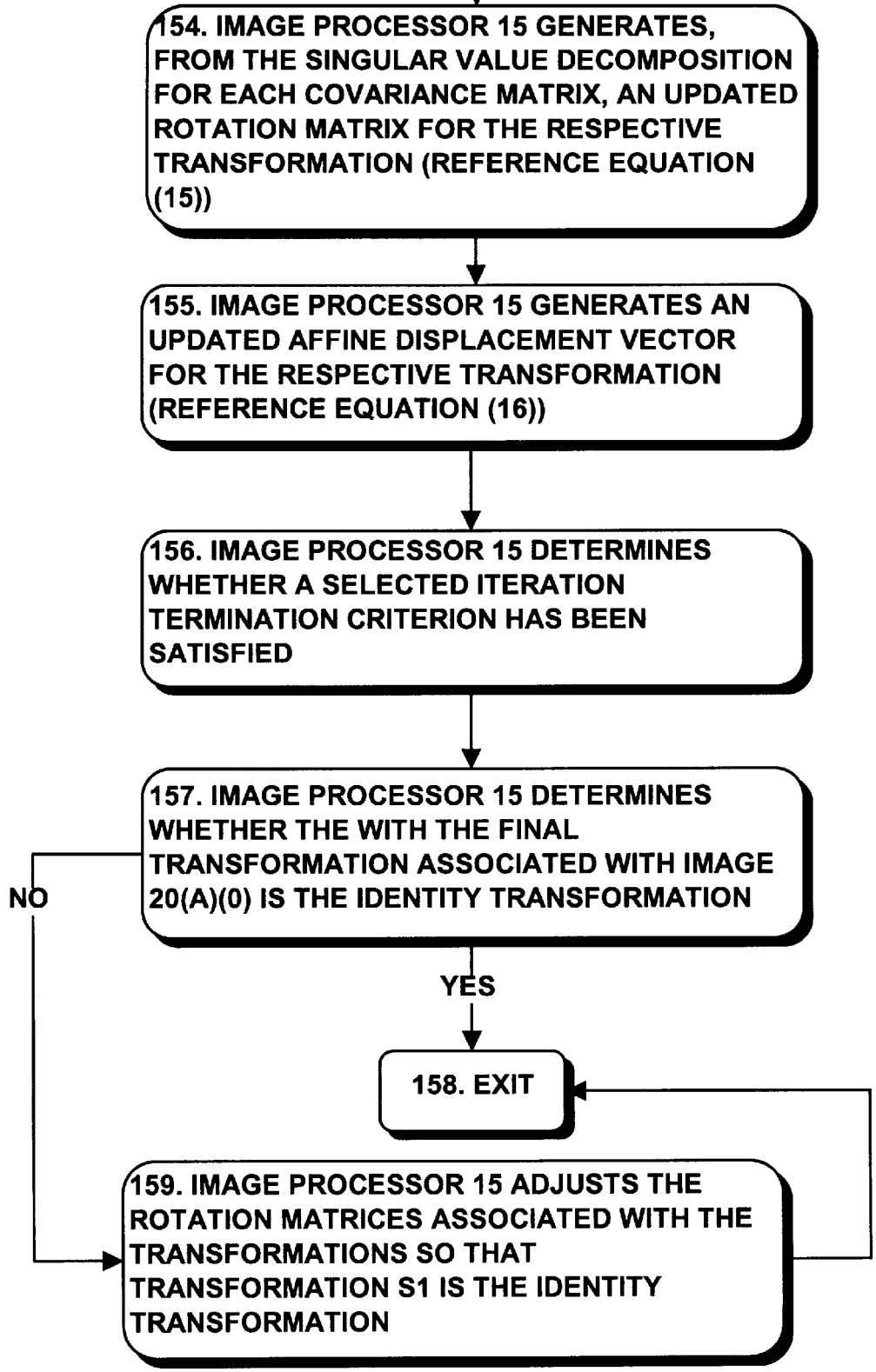

As an extension, using operations described below in connection with FIG. 5, after the image processor 15 has determined the values for the translational and rotational components comprising one or more illustrative movements, the image processor 15 generates a maximum likelihood estimate to refine the values using an "E–M" (estimation and maximization) technique. By refining the values for the translational and rotational components in this manner, the image processor 15 can reduce or eliminate errors which may develop particularly in connection with determining values for such components for a plurality of successive illustrative movements to facilitate relating coordinate systems associated with each illustrative movement to a common coordinate system.

More specifically, and with reference to FIG. 2, the image processor 15 initially determines, for a set of points on the surface(s) of the respective object(s) in the scene 14, coordinates of each of the points in both the coordinate system before the illustrative movement 18 and the coordinate system after the illustrative movement 18 (step 100). After the image processor 15 has determined coordinates of the points in both coordinate systems, it will use the coordinates in the two coordinate systems to relate the coordinate system after the illustrative movement 18 to the coordinate system before the illustrative movement 18, to determine the values of the translational and rotational components comprising the illustrative movement 18 (step 101). After the image processor 15 has determined the values for the translational and rotational components for the illustrative movement 18, it can use them to convert the coordinates of the points which are defined in coordinate system after the illustrative movement 18 to the coordinate system before the illustrative movement 18 (step 102). The details of the operations performed by the image processor 15 in connection with steps 100 and 101 will be described in connection with the flowcharts depicted in FIGS. 3 and 4, respectively.

Figure 3A:
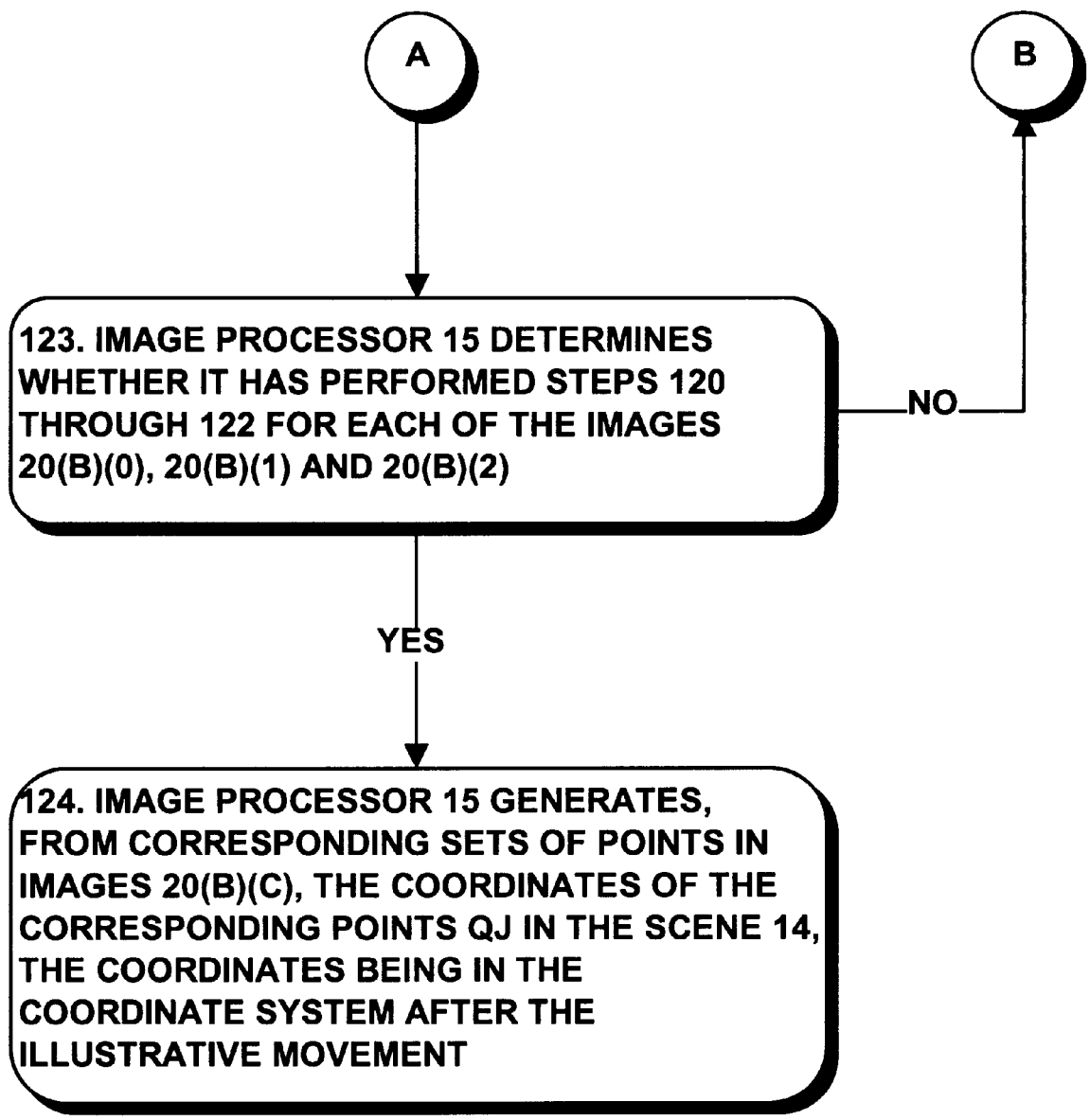

FIG. 3 depicts operations performed by the image processor 15 in connection with determining, for a set of points on the surface(s) of the respective object(s) in the scene 14, coordinates of each of the points in both the coordinate system before the illustrative movement 18 and the coordinate system after the illustrative movement 18 (reference step 100). In performing step 100, the image processor 15 several general operations. First, the image processor identifies coordinates, in the respective images 20(B)(c), of sets of points, with the points each set corresponding to a point in the image 20(A)(0). Points in each set so identified will be a projection of the same point in the scene 14 as the point in the image 20(A)(0). Since the points in a set are projections of the same point in the scene 14, the image processor 15 can determine the coordinates of the point in the scene 14 in the coordinate system after the illustrative movement 18, that is, the coordinate system relative to image 20(B)(0), using the tensor and the coordinates of the points in the set in the respective images 20(B)(c).

As noted above, the illustrative movement 18 is such to ensure that the sets of images 20(A)(c) and 20(B)(c) overlap to some extent, and the image processor 15 makes use of the information contained in the overlapping portions in determining the translational and/or rotational components of the illustrative movement 18. However, the image processor 15 does not know which portions of the respective sets of images 20(A)(c) and 20(B)(c) overlap, and so it will initially determine the portions of the images in each set which overlap with the images in the other set. More specifically, in connection with step 100, the image processor 15 initially determines for each of the images 20(B)(c), the portion of the respective image 20(B)(c) which overlaps with the image 20(A)(0), which image, as noted above, is recorded by the camera 12(0) before the illustrative movement 18 and which serves to define the common coordinate system. In that connection, for each image 20(B)(c), the image processor 15 determines the dominant translation $(u_D, v_D)$ that best aligns the largest portions of image 20(A)(0) and the respective image 20(B)(c) (step 120), and then shifts the respective image 20(B)(c) by shifting the coordinates of the points of the respective image 20(B)(c) by the dominant translation $(u_D, v_D)$ to create a respective shifted image 20(B')(c) (step 121). The image processor 15 generates values for the dominant translation $(u_D, v_D)$ for each image 20(B)(c), and different values may be generated for "$u_D$" and "$v_D$" for each of the images 20(B)(c). Details of operations performed by the image processor 15 in connection with steps 120 and 121 will be described below in connection with equations (1) through (3). In any case, the effect of steps 120 and 121, as applied to each image 20(B)(c) is to effectively shift the portion of the respective image 20(B)(c) which overlaps with the image 20(A)(0) to approximately the same coordinate positions in the respective image.

Following step 121, the image processor 15 generates a pixel-to-pixel correspondence between image 20(A)(0) and each of the respective shifted images 20(B')(c), the pixel-to-pixel correspondence defining a displacement field $(u_P(x,y), v_P(x,y))$ that identifies the displacement, from location (x,y) of the point in the image 20(A)(0), to the location $(x+u_P(x,y), y+v_P(x,y))$ of the corresponding point in the respective shifted image 20(B')(c). Details of operations performed by the image processor in connection with step 122 will be described below in connection with equations (4) through (6). After the image processor 15 has determined, for a particular image 20(B)(c), the dominant translation $(u_D, v_D)$ and the displacement field $(u_P(x,y), v_P(x, y))$, for each point in image 20(A)(0) which is also depicted in image 20(B)(c), the coordinates of the point in image 20(B)(c) can be determined from the coordinates (x,y) of the corresponding point in image 20(A)(c), the dominant translation $(u_D, v_D)$ and the appropriate value from the displacement field $(u_P(x,y), v_P(x,y))$. After the image processor 15 has performed steps 120 through 122 for each of the images 20(B)(0), 20(B)(1) and 20(B)(2) (step 123), it will have determined, for each point $p_j$ in image 20(A)(0) in the regions which overlap with respective images 20(B)(0), 20(B)(1) and 20(B)(2), coordinates of corresponding points in those images 20(B)(0), 20(B3)(1) and 20(B)(2), that is, coordinates of a respective set of point $q_j$, $q_j'$ and $q_j''$ which are projections of the same respective point $Q_j$ in the scene 14. It will be appreciated that, since the points $q_j$, $q_j'$ and $q_j''$ in each set all correspond to the point $p_j$ in image 20(A)(0), and since that point $p_j$ is also a projection of a point $P_j$ in the scene 14, the points $P_j$ and $Q_j$ correspond to the same point in the scene 14. In any case, after the image processor 15 has determined the coordinates of sets of points $q_j$, $q_j'$ and $q_j''$ in images 20(B)(0), 20(B)(1) and 20(B)(2), respectively, it can generate the coordinates of the corresponding points $Q_j$ in the scene 14 using the tensor as described in the aforementioned Shashua application (step 124). It will be appreciated that the coordinates of the point $Q_j$ will be in the coordinate system after the illustrative movement 18, as defined by image 20(B)(0).

As noted above, in performing steps 120 and 121 in connection with one of the images 20(B)(c), the image processor 15 initially determines the dominant translation $(u_D, v_D)$ that best aligns the largest portions of image 20(A) (0) and the respective image 20(B)(c), and then shifts the respective image 20(B)(c) by the dominant translation $(u_D, v_D)$ so generated to generate a respective shifted image 20(B')(c). In one embodiment, the image processor 15 determines the dominant translation $(u_D, v_D)$ (reference step 120) by means of a first-order Taylor expansion of the sum of squares difference ("SSD") between the two images. In that embodiment, the dominant translation $(u_D, v_D)$ corresponds to the translation that minimizes $$\sum_R (A_0(x, y) - B_c(x + u_D, y + v_D))^2, \qquad (1)$$

where $A_0(x,y)$ represents the intensity map of image 20(A) (0), $B_c(x+u_D, y+v_D)$ represents the intensity map of the respective image 20(B)(c), "x" and "y" represent the coordinates of the respective picture elements, or "pixels" in the respective images 20(A)(0) and 20(B)(c), and "R" represents the respective overlapping portions. In that case, then $$(A_0(x,y)-B_c(x+u_D,y+v_D))-u_D B_{c_x}(x+u_D,y+v_D)-v_D B_{c_y}(x+u_D,y+v_D)=0, \quad (2)$$

where $B_{c_x}(x+u_D,y+v_D)$ and $B_{c_y}(x+u_D, y+v_D)$ represent the "x" and "y" components, respectively, of the gradient of the intensity values for the respective images 20(B)(c), should hold for each point in the respective pair of images 20(A)(0) and 20(B)(c). The image processor 15 minimizes equation (2) with respect to "$u_D$" and "$v_D$" by, in turn, solving $$\begin{bmatrix} \sum (B_{c_x})^2 & \sum B_{c_x} B_{c_y} \\ \sum B_{c_x} B_{c_y} & \sum (B_{c_y})^2 \end{bmatrix} \begin{bmatrix} u_D \\ v_D \end{bmatrix} = \begin{bmatrix} -\sum (A_0 - B_c) B_{c_x} \\ -\sum (A_0 - B_c) B_{c_y} \end{bmatrix}, \quad (3)$$

where the sum is over respective regions of images 20(A)(0) and 20(B)(c), for "$u_D$" and "$v_D$" for each image 20(13)(c). In one embodiment, the image processor 15 solves equation (3) for "$u_D$" and "$v_D$" using the well-known Newton-Raphson iterative optimization technique.

As noted above, after the dominant translation ($u_D,v_D$) has been generated using equations (1) through (3) (reference step 120), the image processor 15 shifts the respective image 20(B)(c) to by ($u_D,v_D$) to generate a shifted image 20(B')(c) (reference step 121). Following step 121, the image processor 15 generates a pixel-to-pixel correspondence between image 20(A)(0) and each of the respective shifted images 20(B')(c) to generate a displacement field ($u_P(x,y),v_P(x,y)$) (step 122). In performing step 122, in one embodiment the image processor 15 determines the displacement field ($u_P(x,y),v_P(x,y)$) using a differential method based on the first order Taylor expansion of the sum of squares difference of a local region, or window. In that embodiment, the pixel-to-pixel correspondence corresponds to the translation that minimizes $$\sum_k (A_0(x, y) - B_c'(x + u_P, y + v_P))^2, \quad (4)$$

where $A_0(x,y)$ represents the intensity map of image 20(A)(0), $B'_c(x+u_P,y+v_P)$ represents the intensity map of the respective shifted image 20(B')(c), "x" and "y" represent the coordinates of the respective picture elements, or "pixels" in the image 20(A)(0) and shifted image 20(B')(c), respectively, "k" is an index, and the sum is over a small window around the respective pixel at location (x,y). In one embodiment, the window is a five pixel-by-five pixel window around the respective pixel (x,y), although it will be appreciated that other size windows can be used. In that case, then $$(A_0(x,y)-B'_c(x+u_P,y+v_P))-u_P B'_{c_x}(x+u_P,y+v_P)-v_P B'_{c_y}(x+u_P,y+v_P)=0, \quad (2)$$

where $B'_{c_x}(x+u_P,y+v_P)$ and $B'_{c_y}(x+u_P,y+v_P)$ represent the "x" and "y" components, respectively, of the gradient of the intensity values for the respective shifted image 20(B')(c), should hold for each point in the respective image 20(A)(0) and shifted image 20(B')(c) in the window. The image processor 15 minimizes equation (5) with respect to "$u_P$" and "$v_P$" by, in turn, solving $$\begin{bmatrix} \sum (B'_{c_x})^2 & \sum B'_{c_x} B'_{c_y} \\ \sum B'_{c_x} B'_{c_y} & \sum (B'_{c_y})^2 \end{bmatrix} \begin{bmatrix} u_P \\ v_P \end{bmatrix} = \begin{bmatrix} -\sum (A_0 - B'_c) B'_{c_x} \\ -\sum (A_0 - B'_c) B'_{c_y} \end{bmatrix}, \quad (6)$$

for each pixel location (x,y), where each sum is over the pixels in the window, to generate "$u_P$" and "$v_P$" for each location (x,y) in image 20(B)(c). In one embodiment, the image processor 15 solves equation (6) for "$u_P$" (that is, "$u_P(x,y)$") and "$v_P$" (that is, "$v_P(x,y)$") for each pixel location (x,y) using the well-known Newton-Raphson optimization technique, which is performed in a series of iterations. In each iteration, the image processor 15 generates a displacement field ($u_P(x,y),v_P(x,y)$) which it uses to generate an updated shifted image 20(B'$_{UPDATED}$)(c), which is used as the shifted image 20(B')(c) in connection with equation (6) in the next iteration.

In one embodiment, particularly in connection with processing of image 20(A)(0) and a respective shifted image 20(B')(c) for which there are relatively large displacements between corresponding pixels, image processor 15 performs the Newton-Raphson iterations hierarchically in a coarse-to-fine manner. In these operation, the image processor 15 initially divides the image 20(A)(0) and the respective shifted image 20(B')(c) into a hierarchy of images in a predetermined frequency range from a low frequency to a high frequency, with the series of images in the hierarchy associated with image 20(A)(0) and the series in the hierarchy associated with the respective shifted image 20(B')(c) being associated with the same set of frequencies. It will be appreciated that the detail of low frequency images will be relatively coarse and the detail of high frequency images will be relatively fine, and thus the series of images in each hierarchy will extend monotonically from relatively coarse to relatively fine detail. In successive iterations, the image processor 15 processes images from coarse (low frequency) to fine (high frequency) and, in each iteration, the image processor 15 processes a pair of images from the respective hierarchies (that is, the hierarchy associated with image 20(A)(0) and the hierarchy associated with the respective shifted image 20(B')(c)) that are associated with the same frequency. The image processor 15 adjusts the size of the window used in the respective iterations according to the frequency of the images that are being processed during the iteration; in particular, the window will be larger when lower frequency (that is, coarser) images are processed, and smaller when high frequency (that is, finer) images are processed. In each iteration, the image processor 15 generates a displacement field ($u_P(x,y),v_P(x,y)$), as described above in connection with equation (6), for each pixel in the images from the hierarchy which is amplified and used to generate a respective updated shifted image 20 (B'$_{UPDATED}$)(c) for use as the shifted image 20(B')(c) in connection with equation (6) in the next iteration as described above. The image processor 15 performs successive iterations throughout the respective hierarchies it of images, until it has processed the finest (highest-frequency) image, at which point it will have generated the displacement field ($u_P(x,y),v_P(x,y)$)

It will be appreciated that, after the image processor has performed step 124, the image processor 15 will have generated coordinates of at least one point $Q_j$, and possibly a number of points $Q_j$, in scene 14, which are projected onto images 20(B)(c), and which are also projected at least onto image 20(A)(0). As noted above, the coordinates of points $Q_j$ will be in the coordinate system associated with image 20(B)(0), whereas the coordinates of the same points, identified as points $P_j$, projected onto images 20(A)(c) are in the coordinate system associated with image 20(A)(0). Thus, following step 124, it will use the coordinates in the two coordinate systems to relate the coordinate system after the illustrative movement 18 to the coordinate system before the illustrative movement 18, to determine the translational and rotational components comprising the illustrative movement 18 (reference step 101, FIG. 2). In that connection, the translational and rotational components comprising the illustrative movement 18 will be such as to minimize $$\sum_{j} \|RP_j + t - Q_j\|^2 \quad (7)$$

where "R" represents the rotational component of the illustrative movement 18, "t" represents the translational component of the illustrative movement 18, and "$P_j$" and "$Q_j$" represent corresponding points, in their respective coordinate systems. In (7), the translation "t" can be determined since, after finding the rotation "R," it is evident that the appropriate translation is simply Q'-RP', where P' is the average over the points $P_j$ and Q' is the average over the points $Q_j$. It will be appreciated that, after the averages P' and Q' are generated, and if new sets of points $\{P_j\text{-}P'\}_j$ and $\{Q_j\text{-}Q'\}_j$ are introduced, the center of each of these sets is the origin of the respective coordinate system, and thus the best transformation for mapping one of the new sets of points onto the other of the new sets of points involves merely a rotation, which, in turn, corresponds to the rotational component R of the illustrative movement 18. Known algorithms may be used to generate the rotational component R between the sets $\{P_j\text{-}P'\}_j$ and $\{Q_j\text{-}Q'\}_j$, as described in, for example, Gene H. Golub and Charles F. Van Loan, "Matrix Computations" (2d ed) (Johns Hopkins University Press, 1989), page 582 (hereinafter "the Golub, et al., book").

With this background, operations performed by the image processor 15 in connection with generating values for "R" and "t" so as to minimize (7) will be described in connection with FIG. 4. With reference to FIG. 4, the image processor 15 initially determines an average for each of the sets of points $P_j$ and $Q_j$ (step 130), referred to as P' and Q', respectively. After the image processor has generated the averages P' and Q', it generates the sets of points $\{P_j\text{-}P'\}_j$ and $\{Q_j\text{-}Q'\}_j$ (step 131) and, using the sets of points $\{P_j\text{-}P'\}_j$ and $\{Q_j\text{-}Q'\}_j$ generated in step 131, generate the value for the rotational component R using, for example, the algorithm described in the Golub, et al., book (step 132). After generating the value for the rotational component R, the image processor 15 generates the value for the translational component "t" as Q'-RP' (step 133).

After the image processor 15 has determined the values for the translational and rotational components t and R for the illustrative movement 18, it can use them to convert the coordinates of the points which are defined in coordinate system associated with image 20(B)(0) to the coordinate system associated with image 20(A)(0) (reference step 102).

Operations described above in connection with FIGS. 2 through 4 and equations (1) through (7) are an efficient mechanism by which a common coordinate system for points $P_j$ in the scene 14 which are projected onto the images 20(A)(c) recorded by the cameras 12(c) before the illustrative movement 18 and the points $Q_j$ in the scene 14 which are projected onto the images 20(B)(c) recorded by the cameras 12(c) after the illustrative movement 18. In performing the operations as described above, the image processor 15 can process all of the pixels of the images 20(A)(0) and 20(B)(c). However, if it does so, the amount of computation which may be required to be performed by the image processor may be quite substantial, depending on the number of pixels comprising the respective images. In addition, if a number of the pixels in one or more of the images 20(A)(0) are in regions of relatively low-contrast, the values of the results of the computation may be relatively noisy. To reduce both the amount of computation which the may be required and the amount of noise which may be present in the values for the translational and rotational components, the image processor 15 can perform the operations in connection with points $p_j$, $p_j'$, and $p_j''$ on images 20(A)(c), and points $q_j$, $q_j'$ and $q_j''$ on images 20(B)(c), which are deemed to be "good" points. Preferably, a point in one image will be a "good" point if it is likely to have a good match in at least one of the other images, which will generally be the case if the local intensity around the respective point has a relatively high variance, which will be the case if the point is in an region of relatively high contrast in the image, and if the variance of the local intensity is not shaped as a straight line through the point. If $A_c(x,y)$ represents the intensity map of the respective image 20(A)(c), where "x" and "y" represent the coordinates of the respective point in the respective image, a point is considered a "good" point if the matrix $$\begin{bmatrix} \sum (A_{c_x})^2 & \sum A_{c_x} A_{c_y} \\ \sum A_{c_x} A_{c_y} & \sum (A_{c_y})^2 \end{bmatrix} \quad (8)$$

is of rank "two." In the matrix in (8), $A_{c_x}$ and $A_{c_y}$ represent the components of the gradient of the intensity map at the respective point along the respective "x" and "y" axes, and the summation is over a local region around the respective point. In one embodiment, the image processor 15 determines for each point in an image 20(A)(c) whether the matrix in (8) is of rank "two" by determining whether the ratio of the eigenvalues of the matrix is close to one and the value of the smaller eigenvalue is above a selected threshold value. The image processor 15 can identify "good" points in images 20(B)(c), as represented by local intensity maps B(x,y), in a similar manner.

It will be appreciated that the image processor 15 can perform the operations described above in connection with FIGS. 2 through 4 for each of a series of illustrative movements $M_1$, $M_2$, ..., $M_I$ (generally, "$M_i$") of the rig 11 to determine the values for the translational and rotational components of each illustrative movement. Thus, for a first illustrative movement $M_1$ (which may correspond to illustrative movement 18 as described above) the image processor 15 uses the sets of images 20(A)(c) and 20(B)(c) to determine the values for the translational and rotational components of the first illustrative movement $M_1$, thereby to relate the coordinate system associated with image 20(B)(0) to the common coordinate system associated with image 20(A)(0). Similarly, for a second illustrative movement $M_2$, the image processor uses sets of images 20(B)(c) and, for example, 20(C)(c) (not shown) to determine the values for the translational and rotational components of the second illustrative movement $M_2$, thereby to relate the coordinate system associated with image 20(C)(0) to the coordinate system associated with image 20(B)(0). In addition, using the previously-determined values for the translational and rotational components of the first illustrative movement $M_1$, the image processor 15 can readily relate the coordinate system associated with image 20(C)(0) to the common coordinate system associated with image 20(A)(0) in a manner that will be apparent to those skilled in the art. Thus, it will be apparent that the image processor 15 can use successive pairs of sets of images 20(A)(c) and 20(B)(c), 20(B)(c) and 20(C)(c), 20(C)(c) and 20(D)(c), ..., to determine the values for the translational and rotational components associated with each successive illustrative movement $M_1$, $M_2$, $M_3$, ..., to successively relate the respective coordinate system associated with image 20(B)

(0), 20(C)(0), . . . , to the common coordinate system associated with image 20(A)(0). However, it will also be apparent that errors which can develop in the values for the translational and rotational components associated with each movement can propagate to movements thereafter.

To accommodate that, instead of processing successive pairs of sets of images to determine translational and rotational components associated with each successive movement Mi, in one embodiment, the image processor 15 makes use of a statistical methodology, identified as the "E–M" (estimation and maximization) methodology, to generate maximum likelihood estimates of the translational and rotational components associated with the respective movements. In that operation, the image processor 15 determines, from overlapping regions of sets of points in the images 20(A)(0), 20(B)(0), . . . , and in one or more iterations, both coordinates of a set of points of the object(s) in the scene 14 in the common coordinate system and values of the translational and rotational components relative to the common coordinate system of the other coordinate systems.

More specifically, (reference the change in notation from that used in connection with equations (1) through (8) above) given surface features of the object(s) in the scene 14 defined by a set of "n" points $Q=\{q_1, \ldots, q_j, \ldots, q_n\}$, and given a set "P" of "m" images $P=\{P_1, \ldots, P_i, \ldots, P_m\}$ of the scene 14, each image $P_i$ comprising points $p_{ij}$ which are projections of the respective points $q_j$ in the scene, then $$p_{ij}=S_i(q_j)+\epsilon_{ij}=A_iq_j+b_i+\epsilon_{ij} \; i=1, \ldots, m \; j=1, \ldots, n, \quad (9)$$

where each "$S_i$" is one of a plurality of transformations $S=\{S_1, \ldots, S_i, \ldots S_m\}$, each transformation $S_i$ being associated with a correspondingly-indexed image $P_i$ consisting of a rotation matrix $A_i$ and an affine displacement vector $b_i$ $$S_i(q_j)=A_iq_q+b_i \quad (10)$$

The coordinates of each point $p_{ij}$ in the respective image $P_i$ are noisy, and the value "$\epsilon_{ij}$" in equation (9) comprises a vector representing the noise component of the respective point. In the following, it will be assumed that $\epsilon_{ij}$ is a Gaussian random vector with a zero mean (average) and a scalar covariance matrix $\sigma^2 I$, where "I" represents a three-by-three (or "d-by-d," where "d" represents the number of dimensions in the scene 14) identity matrix. It will further be assumed that the vectors $\epsilon_{ij}$ associated with the points $p_{ij}$ in the various images $P_i$ are mutually independent. With these assumptions, in each iteration, the image processor 15 can generate, in an estimation phase of the iteration, a new maximum likelihood estimate of the coordinates of each of the points in the scene 14, identified as $\hat{q}_j(S_0)$, as $$\hat{q}_j(S_0) = \frac{1}{m}\sum_{i=1}^{m} S_{0i}^{-1}(p_{ij}) \; j=1,\ldots,n \quad (11)$$

where "$S_0$" represents, for the first iteration, an initial set of transformations $S_0=\{S_{01},\ldots,S_{0m}\}$, and, for each subsequent iteration, a corresponding set of transformations as determined during the previous iteration, and $S_{0i}^{-1}(p_{ij})$ represents the inverse transformation for point $p_{ij}$ under the respective transformation $S_{0i}$.

After the estimation phase of each iteration, the image processor 15 can generate re-estimations for the transformations $S_i$ during a maximum phase. If a subsequent iteration is to be performed, the set of re-estimated transformations generated during the iteration can be used as the transformation set $S_0$ during the subsequent iteration. On the other hand, if no subsequent iteration is to be performed, the set of re-estimated transformations can be used as the transformations to relate the various coordinate systems to the common coordinate system. In re-estimating each transformation $S_i=(A_i,b_i)$, the image processor 15 generates a covariance matrix $H_i$ as $$H_i = \frac{1}{n}\sum_{j=1}^{n}(\hat{q}(S_0) - \bar{q}(S_0))(p_{ij} - \bar{p}_i)^T \; i=1,\ldots,m \quad (12)$$

where $$\bar{q}(S_0) = \frac{1}{n}\sum_{j=1}^{n} \hat{q}_j(S_0) \quad (13)$$

and $$\bar{p}_i = \frac{1}{n}\sum_{j=1}^{n} p_{ij} \; i=1,\ldots,m. \quad (14)$$

If $U_iD_iV_i^T$ represents the singular value decomposition ("SVD") of the covariance matrix $H_i$ (see, for example, W. Press, *Numerical Recipes In Fortran* 2d Edition (Cambridge Univ. Press, 1986, 1992), pp. 51 et seq., for a description of singular value decomposition), the image processor 15 generates the re-estimation of the rotation matrix $A_i$ as $$A_i=V_iU_i^{-T} \quad (15)$$

and, using the value for $A_i$ generated using equation 13, generates the re-estimation of the affine displacement vector $b_i$ as $$b_i=\bar{p}_i-A_i\bar{q}(S_0) \quad (16)$$

for i=1, . . . , m.

The image processor 15, in connection with the E–M methodology, can perform a number of iterations until selected termination criteria have been satisfied. In accordance with one termination criterion, the image processor 15 can perform a number of iterations until the transformations $S_i=(A_i, b_i)$ which are generated during an iteration correspond to the transformations which were generated during the previous iteration, or differ by a predetermined maximum tolerance value. Alternatively, or in addition, the image processor 15 can perform a number of iterations until it has performed a predetermined maximum number of iterations.

In the processing operations in connection with equations (9) through (16) above, the images $P_i$ correspond to the images 20(A)(0), 20(B)(0), . . . , which define the coordinate systems for the various sets of images 20(A)(c), 20(B)(c), . . . . During the first iteration, the image processor 15 can select the transformation $S_1$, which is associated with image $P_1$ (which corresponds to image 20(A)(0), whose coordinate system defines the common coordinate system as described above in connection with equations (1) through (8) and FIGS. 2 through 4) to be the identity transformation, and the other transformations will correspond to the translational and rotational components determined as described above in connection with equations (1) through (8) and FIGS. 2 through 4. In successive iterations, the rotation matrix $A_1$ generated for the transformation $S_1$ may be perturbed slightly, but from equation (16) it is clear that the affine displacement vector $b_1$ generated for the transformation $S_1$ will be zero for each iteration. After the image processor 15 has performed the number of iterations, if the rotation matrix $A_1$ for transformation $S_1$ is such that the transformation $S_1$ is not the identity transformation, it can adjust the transformation $S_1$ and other transformations $S_2$, . . . so as to force the transformation $S_1$ to the identity transformation. In that operation, since the affine displacement vector $b_1$ of transformation $S_1$ is identically zero, the adjustments to the transformations involve only adjustments to the rotation matrices.

With this background, the operations performed by the image processor 15 in connection with the E–M methodology (equations (9) through (16)) will be described in connection with FIG. 5. With reference to FIG. 5, the image processor 15 first determines the initial set of transformations using points which are projected into all of the images 20(A)(0), 20(B)(0), . . . which define the respective coordinate systems associated with the respective sets of images 20(A)(c), 20(B)(c), . . . , with the transformation set $S_1$ associated with image 20(A)(0) being forced to the identity transformation (step 150). Thereafter, the image processor 15 performs, for each image 20(A)(0), 20(B)(0), . . . , the estimation phase to generate a new maximum likelihood estimate of the coordinates of respective points in the scene 14 (step 151) in connection with equation (11). Following step 151, the image processor 15 generates, for each image 20(A)(0), 20(B)(0), . . . , a covariance matrix $H_i$ (equations (12) through (14)) (step 152), determines the singular value decomposition $U_i D_i V_i^T$ thereof (step 153) and generates therefrom an updated rotation matrix $A_i$ for the respective transformation $S_i$ using matrices $U_i$ and $V_i^T$ (step 154) in accordance with equation (15). After the updated rotation matrix $A_i$ has been determined for a respective transformation, the image processor 15 generates an updated affine displacement vector $b_i$ for the transformation (step 155) in accordance with equation (16).

After updated rotation matrices $A_i$ and affine displacement vectors $b_i$ have been generated for all of the transformations $S_i$, the image processor 15 determines whether an iteration termination criterion has been satisfied, such that it should terminate iterations (step 156). If the image processor 15 makes a negative determination in step 156, it will return to step 151 to repeat the operations described above in connection with steps 151 through 156. On the other hand, if the image processor 15 makes a positive determination in step 156, it will sequence to step 157 to determine whether the with the final transformation $S_1$ is the identity transformation. If the image processor 15 makes a positive determination in step 157, it will exit (step 158), with the transformations $S_2$ . . . defining the translational and rotational components which relate the respective coordinate systems associated with images 20(B)(0), . . . to the common coordinate system associated with image 20(A)(0). On the other hand, if the image processor 15 makes a negative determination in step 157, it will adjust the rotation matrices $A_i$ associated with the transformations so that transformation $S_i$ is the identity transformation (step 159) and sequence to step 158 to exit.

The invention provides a number of advantages. In particular, the invention provides a mechanism whereby reconstructions of objects in a scene, with each reconstruction comprising points in respective three-dimensional coordinate systems, can be related to a common coordinate system.

It will be appreciated that numerous modifications may be made to the system as described above. For example, although the system has been described as using reconstructions generated using the tensor as described in the Shashua application, it will be appreciated that reconstructions using other methodologies including, for example, the Fundamental Matrix, can also be used. Indeed, the system can use reconstructions generated by any combination of methodologies, that is, one reconstruction may be generated using the tensor described in the Shashua tensor and another reconstruction may be generated using the Fundamental Matrix. It will be appreciated that, if the reconstruction generated using images 20(B)(c) is generated using the Fundamental Matrix, then only two images will be needed, in which portions of two images will need to overlap with the image 20(A)(0).

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the united states is:

1. A system for stitching a plurality of reconstructions of three-dimensional surface features of at least one object in a scene, each reconstruction generated from an image set comprising a plurality of two-dimensional images of the scene, each reconstruction further being defined relative to a respective one of a plurality of reconstruction coordinate systems defined relative to one of the images in the respective image set, to relate the reconstructions to a common coordinate system, the system comprising:

A. a reconstruction-to-common coordinate relation generator configured to generate, from at least one of the images in the respective image sets, values for translational and rotational components relating a respective reconstruction coordinate system to the common coordinate system; and B. a coordinate converter configured to use the values of the translational and rotational components to convert coordinates of the surface features in the respective reconstruction coordinate systems to the common coordinate system.

2. A system as defined in claim 1 in which said reconstruction-to-common coordinate relation generator generates said values for said translational and rotational components using regions of ones of said images, relative to which the respective reconstruction coordinate systems are defined, which overlap with one another.

3. A system as defined in claim 1 in which the common coordinate system comprises one of the reconstruction coordinate systems, the reconstruction-to-common coordinate relation generator being configured to generate values for translational and rotational components relating at least one other reconstruction coordinate system to the one of the reconstruction coordinate system comprising the common coordinate system.

4. A system as defined in claim 3 in which said reconstruction-to-common coordinate relation generator is configured to generate said values for said translational and rotational components using a region of said one of said images relative to which the common coordinate system is defined which overlaps with respective regions of at least one of the images of the image set from which a reconstruction relative to another reconstruction coordinate system was generated.

5. A system as defined in claim 4 in which said reconstruction-to-common coordinate relation generator comprises:
   A. a dominant translation generator configured to generate a dominant translation which best aligns a largest portion of the one of said images relative to which the common coordinate system is defined and at least one of the other images of the image set from which a reconstruction relative to another reconstruction coordinate system was generated;
   B. a shifted image generator configured to shift said at least one of the other images of the image set from which a reconstruction relative to another reconstruction coordinate system was generated by an amount corresponding to the dominant translation;
   C. a displacement field generator configured to generate a displacement field, the displacement field identifying, for at least some pixels of said one of said images relative to which the common coordinate system is defined, a displacement value identifying a displacement relative to a respective corresponding pixel in said at least one of the other images of the image set from which a reconstruction relative to another reconstruction coordinate system was generated;
   D. a translational and rotational coordinate value generator configured to generate the values for the translational and rotational components from the dominant translation and the displacement field.

6. A system as defined in claim 5 in which said dominant translation generator is configured to generate the dominant translation $(u_D, v_D)$ (where $u_D$ and $v_D$ correspond to horizontal and vertical dominant translation components) to correspond to the translation that minimizes $$\sum_R (A_0(x, y) - B_c(x + u_D, y + v_D))^2$$

where $A_0(x,y)$ corresponds to an intensity map for the one of said images relative to which the common coordinate system is defined and $B_0(x+u_D, y+v_D)$ correspond to an intensity map for said at least one of the other images of the image set from which a reconstruction relative to another reconstruction coordinate system was generated.

7. A system as defined in claim 6 in which said dominant translation generator is configured to generate the dominant translation $(u_D, v_D)$ (where $u_D$ and $v_D$ correspond to horizontal and vertical dominant translation components) to correspond to the translation that minimizes $$\sum_R (A_0(x, y) - B_c(x + u_D, y + v_D))^2$$

by solving $$\begin{bmatrix} \sum (B_{c_x})^2 & \sum B_{c_x} B_{c_y} \\ \sum B_{c_x} B_{c_y} & \sum (B_{c_y})^2 \end{bmatrix} \begin{bmatrix} u_D \\ v_D \end{bmatrix} = \begin{bmatrix} -\sum (A_0 - B_c) B_{c_x} \\ -\sum (A_0 - B_c) B_{c_y} \end{bmatrix}$$

where each sum is over respective regions of the respective images and where $B_{c_x}$ and $B_{c_y}$ represent the horizontal and vertical components, respectively, of the gradient of the intensity values for the at least one of the other images of the image set from which a reconstruction relative to another reconstruction coordinate system was generated.

8. A system as defined in claim 7 in which the dominant translation generator solves $$\begin{bmatrix} \sum (B_{c_x})^2 & \sum B_{c_x} B_{c_y} \\ \sum B_{c_x} B_{c_y} & \sum (B_{c_y})^2 \end{bmatrix} \begin{bmatrix} u_D \\ v_D \end{bmatrix} = \begin{bmatrix} -\sum (A_0 - B_c) B_{c_x} \\ -\sum (A_0 - B_c) B_{c_y} \end{bmatrix}$$

for "$u_D$" and "$v_D$" using a Newton-Raphson iterative optimization technique.

9. A system as defined in claim 5 in which the displacement field generator is configured to generate the displacement field in relation to a pixel-to-pixel correspondence that corresponds to a translation that minimizes $$\sum_k (A_0(x, y) - B'_c(x + u_P, y + v_P))^2$$

where $A_0(x,y)$ represents an intensity map for the one of said images relative to which the common coordinate system is defined and $B'_c(x+u_P, y+v_P)$ represents an intensity map of the shifted image, "x" and "y" represent coordinates of the respective picture elements in the respective image and shifted image, and "k" represents a window around the respective pixel at location (x,y).

10. A system as defined in claim 9 in which the window is a five pixel by five pixel window.

11. A system as defined in claim 9 in which the displacement field generator is configured to generate the displacement field that minimizes $$\sum_k (A_0(x, y) - B'_c(x + u_P, y + v_P))^2$$

by solving $$\begin{bmatrix} \sum (B'_{c_x})^2 & \sum B'_{c_x} B'_{c_y} \\ \sum B'_{c_x} B'_{c_y} & \sum (B'_{c_y})^2 \end{bmatrix} \begin{bmatrix} u_P \\ v_P \end{bmatrix} = \begin{bmatrix} -\sum (A_0 - B'_c) B'_{c_x} \\ -\sum (A_0 - B'_c) B'_{c_y} \end{bmatrix}$$

for each pixel location (x,y), where each sum is over the pixels in the window, to generate values for "$u_P$" and "$v_P$" for each location (x,y).

12. A system as defined in claim 11 in which said displacement field generator is configured to solve $$\begin{bmatrix} \sum (B'_{c_x})^2 & \sum B'_{c_x}B'_{c_y} \\ \sum B'_{c_x}B'_{c_y} & \sum (B'_{c_y})^2 \end{bmatrix} \begin{bmatrix} u_P \\ v_P \end{bmatrix} = \begin{bmatrix} -\sum (A_0 - B'_c)B'_{c_x} \\ -\sum (A_0 - B'_c)B'_{c_y} \end{bmatrix}$$

to generate values for "$u_P$" and "$v_P$" for each location (x,y) using a Newton-Raphson optimization technique.

13. A system as defined in claim 12 in which said displacement field generator is configured to solve $$\begin{bmatrix} \sum (B'_{c_x})^2 & \sum B'_{c_x}B'_{c_y} \\ \sum B'_{c_x}B'_{c_y} & \sum (B'_{c_y})^2 \end{bmatrix} \begin{bmatrix} u_P \\ v_P \end{bmatrix} = \begin{bmatrix} -\sum (A_0 - B'_c)B'_{c_x} \\ -\sum (A_0 - B'_c)B'_{c_y} \end{bmatrix}$$

to generate values for "$u_P$" and "$v_P$" for each location (x,y) in a series of iterations.

14. A system as defined in claim 13 in which the displacement field generator is configured to perform the iterations hierarchically in a coarse-to-fine manner.

15. A system as defined in claim 5 in which translational and rotational coordinate value generator is configured to generate the values for the translational and rotational components so as to minimize $$\sum_j \|RP_j + t - Q_j\|^2$$

where "R" represents the rotational component, "t" represents the translational component and "$P_j$" and "$Q_j$" represent corresponding points in the respective common and reconstruction coordinate systems.

16. A system as defined in claim 3, the system stitching a plurality of reconstructions of three-dimensional surface features of at least one object in a scene, each reconstruction generated from an image set comprising a plurality of two-dimensional images of the scene, each reconstruction further being defined relative to a respective one of a plurality of reconstruction coordinate systems defined relative to one of the images in the respective image set, the reconstruction-to-common coordinate relation generator being configured to generate transformations, each comprising a value for the translational and rotational component, using a maximum likelihood methodology.

17. A system as defined in claim 16 in which, in accordance with the maximum likelihood methodology, the reconstruction-to-common coordinate relation generator is configured to perform at least one iteration including an estimation phase in which it generates a new maximum likelihood estimate for coordinates of respective points in the scene and a maximum phase in which it generates re-estimations for each of the transformations.

18. A system as defined in claim 17 in which the reconstruction-to-common coordinate relation generator is configured to, during the estimation phase of each iteration, generate a new maximum likelihood estimate of coordinates of respective points in the scene, identified as $\hat{q}(S_0)$, as $$\hat{q}_j(S_0) = \frac{1}{m}\sum_{i=1}^{m} S_{0i}^{-1}(p_{ij}) \quad j = 1, \ldots, n \quad (27)$$

where "$S_0$" represents, for the first iteration, an initial set of transformations $S_0 = \{S_{01}, \ldots, S_{0m}\}$, and, for each subsequent iteration, a corresponding set of transformations as determined during the previous iteration, and $S_{0i}^{-1}(p_{ij})$ represents the inverse transformation for point $p_{ij}$ in the scene under the respective transformation $S_{0i}$.

19. A system as defined in claim 17 in which the reconstruction-to-common coordinate relation generator is configured to, during the maximum phase, generate a re-estimation for each transformation $S_i = (A_i, b_i)$, where "$A_i$" represents a rotation matrix and "$b_i$" represents an affine depth value, generate a covariance matrix $H_i$ as $$H_i = \frac{1}{n}\sum_{j=1}^{n}(\hat{q}(S_0) - \overline{q}(S_0))(p_{ij} - \overline{p}_i)^T \quad i = 1, \ldots, m$$

where $$\overline{q}(S_0) = \frac{1}{n}\sum_{j=1}^{n}\hat{q}_j(S_0)$$

and $$\overline{p}_i = \frac{1}{n}\sum_{j=1}^{n} p_{ij} \quad i = 1, \ldots, m$$

and to generate a re-estimation of the rotation matrix $A_i$ as $$A_i = V_i U_i^T$$

where $U_i D_i V_i^T$ represents a singular value decomposition ("SVD") of the covariance matrix $H_i$, and to generate the re-estimation of the affine displacement vector $b_i$ as $$b_i = \overline{p}_i - A_i \overline{q}(S_0)$$

for i=1, ..., m.

20. A method of stitching a plurality of reconstructions of three-dimensional surface features of at least one object in a scene, each reconstruction generated from an image set comprising a plurality of two-dimensional images of the scene, each reconstruction further being defined relative to a respective one of a plurality of reconstruction coordinate systems defined relative to one of the images in the respective image set, to relate the reconstructions to a common coordinate system, the system comprising:

A. a reconstruction-to-common coordinate relation generating step in which, from at least one of the images in the respective image sets, values for translational and rotational components relating a respective reconstruction coordinate system to the common coordinate system are generated; and B. a coordinate conversion step in which the values of the translational and rotational components are used to convert coordinates of the surface features in the respective reconstruction coordinate systems to the common coordinate system.

21. A method as defined in claim 20 in which said reconstruction-to-common coordinate relation generating step includes the step of generating said values for said translational and rotational components using regions of ones of said images, relative to which the respective reconstruction coordinate systems are defined, which overlap with one another.

22. A method as defined in claim 20 in which the common coordinate system comprises one of the reconstruction coordinate systems, the reconstruction-to-common coordinate relation generating step including the step of generating values for translational and rotational components relating at least one other reconstruction coordinate system to the one of the reconstruction coordinate system comprising the common coordinate system.

23. A method as defined in claim 22 in which said reconstruction-to-common coordinate relation generating step includes the step of generating said values for said translational and rotational components using a region of said one of said images relative to which the common coordinate system is defined which overlaps with respective regions of at least one of the images of the image set from which a reconstruction relative to another reconstruction coordinate system was generated.

24. A method as defined in claim 23 in which said reconstruction-to-common coordinate relation generating step comprises:
   A. a dominant translation generating step in which a dominant translation is generated which best aligns a largest portion of the one of said images relative to which the common coordinate system is defined and at least one of the other images of the image set from which a reconstruction relative to another reconstruction coordinate system was generated;
   B. a shifted image generating step in which at least one of the other images of the image set from which a reconstruction relative to another reconstruction coordinate system was generated is shifted by an amount corresponding to the dominant translation;
   C. a displacement field generating step in which a displacement field is generated, the displacement field identifying, for at least some pixels of said one of said images relative to which the common coordinate system is defined, a displacement value identifying a displacement relative to a respective corresponding pixel in said at least one of the other images of the image set from which a reconstruction relative to another reconstruction coordinate system was generated;
   D. a translational and rotational coordinate value generating step in which the values for the translational and rotational components are generated from the dominant translation and the displacement field.

25. A method as defined in claim 24 in which said dominant translation generating step includes the step of generating the dominant translation ($u_D$,$v_D$) (where $u_D$ and $v_D$ correspond to horizontal and vertical dominant translation components) to correspond to the translation that minimizes $$\sum_R (A_0(x, y) - B_c(x + u_D, y + v_D))^2$$

where $A_0(x,y)$ corresponds to an intensity map for the one of said images relative to which the common coordinate system is defined and $B_0(x+u_D,y+v_D)$ correspond to an intensity map for said at least one of the other images of the image set from which a reconstruction relative to another reconstruction coordinate system was generated.

26. A method as defined in claim 25 in which said dominant translation generating step includes the step of generating the dominant translation ($u_D$,$v_D$) (where $u_D$ and $v_D$ correspond to horizontal and vertical dominant translation components) to correspond to the translation that minimizes $$\sum_R (A_0(x, y) - B_c(x + u_D, y + v_D))^2$$

by solving $$\begin{bmatrix} \sum (B_{c_x})^2 & \sum B_{c_x} B_{c_y} \\ \sum B_{c_x} B_{c_y} & \sum (B_{c_y})^2 \end{bmatrix} \begin{bmatrix} u_D \\ v_D \end{bmatrix} = \begin{bmatrix} -\sum (A_0 - B_c) B_{c_x} \\ -\sum (A_0 - B_c) B_{c_y} \end{bmatrix}$$

where each sum is over respective regions of the respective images and where $B_{c_x}$ and $B_{c_y}$ represent the horizontal and vertical components, respectively, of the gradient of the intensity values for the at least one of the other images of the image set from which a reconstruction relative to another reconstruction coordinate system was generated.

27. A method as defined in claim 26 in which the dominant translation generating step includes the a step of solving $$\begin{bmatrix} \sum (B_{c_x})^2 & \sum B_{c_x} B_{c_y} \\ \sum B_{c_x} B_{c_y} & \sum (B_{c_y})^2 \end{bmatrix} \begin{bmatrix} u_D \\ v_D \end{bmatrix} = \begin{bmatrix} -\sum (A_0 - B_c) B_{c_x} \\ -\sum (A_0 - B_c) B_{c_y} \end{bmatrix}$$

for "$u_D$" and "$v_D$" using a Newton-Raphson iterative optimization technique.

28. A method as defined in claim 24 in which the displacement field generating step includes the step of generating the displacement field in relation to a pixel-to-pixel correspondence that corresponds to a translation that minimizes $$\sum_k (A_0(x, y) - B'_c(x + u_P, y + v_P))^2$$

where $A_0(x,y)$ represents an intensity map for the one of said images relative to which the common coordinate system is defined and $B'_c(x+u_P,y+v_P)$ represents an intensity map of the shifted image, "x" and "y" represent coordinates of the respective picture elements in the respective image and shifted image, and "k" represents a window around the respective pixel at location (x,y).

29. A method as defined in claim 28 in which the window is a five pixel by five pixel window.

30. A method as defined in claim 28 in which the displacement field generating step includes the step of generating the displacement field that minimizes $$\sum_k (A_0(x, y) - B'_c(x + u_P, y + v_P))^2$$

by solving $$\begin{bmatrix} \sum (B'_{c_x})^2 & \sum B'_{c_x} B'_{c_y} \\ \sum B'_{c_x} B'_{c_y} & \sum (B'_{c_y})^2 \end{bmatrix} \begin{bmatrix} u_P \\ v_P \end{bmatrix} = \begin{bmatrix} -\sum (A_0 - B'_c) B'_{c_x} \\ -\sum (A_0 - B'_c) B'_{c_y} \end{bmatrix}$$

for each pixel location (x,y), where each sum is over the pixels in the window, to generate values for "$u_P$" and "$v_P$" for each location (x,y).

31. A method as defined in claim 30 in which said displacement field generating step includes the step of solving $$\begin{bmatrix} \sum (B'_{c_x})^2 & \sum B'_{c_x} B'_{c_y} \\ \sum B'_{c_x} B'_{c_y} & \sum (B'_{c_y})^2 \end{bmatrix} \begin{bmatrix} u_P \\ v_P \end{bmatrix} = \begin{bmatrix} -\sum (A_0 - B'_c) B'_{c_x} \\ -\sum (A_0 - B'_c) B'_{c_y} \end{bmatrix}$$

to generate values for "$u_P$" and "$v_P$" for each location (x,y) using a Newton-Raphson optimization technique.

32. A method as defined in claim 31 in which said displacement field generating step includes the step of solving $$\begin{bmatrix} \sum (B'_{c_x})^2 & \sum B'_{c_x} B'_{c_y} \\ \sum B'_{c_x} B'_{c_y} & \sum (B'_{c_y})^2 \end{bmatrix} \begin{bmatrix} u_P \\ v_P \end{bmatrix} = \begin{bmatrix} -\sum (A_0 - B'_c) B'_{c_x} \\ -\sum (A_0 - B'_c) B'_{c_y} \end{bmatrix}$$

to generate values for "$u_P$" and "$v_P$" for each location (x,y) in a series of iterations.

33. A method as defined in claim 32 in which the displacement field generating step includes the step of performing the iterations hierarchically in a coarse-to-fine manner.

34. A method as defined in claim 24 in which translational and rotational coordinate value generating step includes the step of generating the values for the translational and rotational components so as to minimize $$\sum_j \| RP_j + t - Q_j \|^2$$

where "R" represents the rotational component, "t" represents the translational component and "$P_j$" and "$Q_j$" represent corresponding points in the respective common and reconstruction coordinate systems.

35. A method as defined in claim 22, the method of stitching a plurality of reconstructions of three-dimensional surface features of at least one object in a scene, each reconstruction generated from an image set comprising a plurality of two-dimensional images of the scene, each reconstruction further being defined relative to a respective one of a plurality of reconstruction coordinate systems defined relative to one of the images in the respective image set, the reconstruction-to-common coordinate relation generating step including the step of generating transformations, each comprising a value for the translational and rotational component, using a maximum likelihood methodology.

36. A method as defined in claim 35 in which, in accordance with the maximum likelihood methodology, the reconstruction-to-common coordinate relation generating step includes the step of performing at least one iteration including an estimation phase to generate a new maximum likelihood estimate for coordinates of respective points in the scene and a maximum phase to generate re-estimations for each of the transformations.

37. A method as defined in claim 36 in which the reconstruction-to-common coordinate relation generating step includes the step of, during the estimation phase of each iteration, generating a new maximum likelihood estimate of coordinates of respective points in the scene, identified as $\hat{q}_j(S_0)$, as $$\hat{q}_j(S_0) = \frac{1}{m} \sum_{i=1}^{m} S_{0i}^{-1}(p_{ij}) \quad j = 1, \ldots, n \qquad (43)$$

where "$S_0$" represents, for the first iteration, an initial set of transformations $S_0 = \{S_{01}, \ldots, S_{0m}\}$, and, for each subsequent iteration, a corresponding set of transformations as determined during the previous iteration, and $S_{0i}^{-1}(p_{ij})$ represents the inverse transformation for point $p_{ij}$ in the scene under the respective transformation $S_{0i}$.

38. A method as defined in claim 36 in which the reconstruction-to-common coordinate relation generating step includes the step of, during the maximum phase, generating a re-estimation for each transformation $S_i=(A_i, b_i)$, where "$A_i$" represents a rotation matrix and "$b_i$" represents an affine depth value, in that operation generating a covariance matrix $H_i$ as $$H_i = \frac{1}{n} \sum_{j=1}^{n} (\hat{q}(S_0) - \bar{q}(S_0))(p_{ij} - \bar{p}_i)^T \quad i = 1, \ldots, m$$

where $$\bar{q}(S_0) = \frac{1}{n} \sum_{j=1}^{n} \hat{q}_j(S_0)$$

and $$\bar{p}_i = \frac{1}{n} \sum_{j=1}^{n} p_{ij} \quad i = 1, \ldots, m$$

generating a re-estimation of the rotation matrix $A_i$ as $$A_i = V_i U_i^T$$

where $U_i D_i V_i^T$ represents a singular value decomposition ("SYD") of the covariance matrix $H_i$, and generating the re-estimation of the affine displacement vector $b_i$ as $$b_i = \bar{p}_i - A_i \bar{q}(S_0)$$

for i=1, . . . , m.

39. A computer program product for use in connection with a computer to provide a system for stitching a plurality of reconstructions of three-dimensional surface features of at least one object in a scene, each reconstruction generated from an image set comprising a plurality of two-dimensional images of the scene, each reconstruction further being defined relative to a respective one of a plurality of reconstruction coordinate systems defined relative to one of the images in the respective image set, to relate the reconstructions to a common coordinate system, the computer program product comprising a computer-readable medium having encoded thereon:

A. a reconstruction-to-common coordinate relation generator module configured to enable the computer to generate, from at least one of the images in the respective image sets, values for translational and rotational components relating a respective reconstruction coordinate system to the common coordinate system; and B. a coordinate converter module configured to enable the computer to use the values of the translational and rotational components to convert coordinates of the surface features in the respective reconstruction coordinate systems to the common coordinate system.

40. A computer program product as defined in claim 39 in which said reconstruction-to-common coordinate relation generator module is configured to enable the computer to generate said values for said translational and rotational components using regions of ones of said images, relative to which the respective reconstruction coordinate systems are defined, which overlap with one another.

41. A computer program product as defined in claim 39 in which the common coordinate system comprises one of the reconstruction coordinate systems, the reconstruction-to-common coordinate relation generator module being configured to enable the computer to generate values for translational and rotational components relating at least one other reconstruction coordinate system to the one of the reconstruction coordinate system comprising the common coordinate system.

42. A computer program product as defined in claim 41 in which said reconstruction-to-common coordinate relation generator module is configured to enable the computer to generate said values for said translational and rotational components using a region of said one of said images relative to which the common coordinate system is defined which overlaps with respective regions of at least one of the images of the image set from which a reconstruction relative to another reconstruction coordinate system was generated.

43. A computer program product as defined in claim 42 in which said reconstruction-to-common coordinate relation generator module comprises:
  A. a dominant translation generator module configured to enable the computer to generate a dominant translation which best aligns a largest portion of the one of said images relative to which the common coordinate system is defined and at least one of the other images of the image set from which a reconstruction relative to another reconstruction coordinate system was generated;
  B. a shifted image generator module configured to enable the computer to shift said at least one of the other images of the image set from which a reconstruction relative to another reconstruction coordinate system was generated by an amount corresponding to the dominant translation;
  C. a displacement field generator module configured to enable the computer to generate a displacement field, the displacement field identifying, for at least some pixels of said one of said images relative to which the common coordinate system is defined, a displacement value identifying a displacement relative to a respective corresponding pixel in said at least one of the other images of the image set from which a reconstruction relative to another reconstruction coordinate system was generated;
  D. a translational and rotational coordinate value generator module configured to enable the computer to generate the values for the translational and rotational components from the dominant translation and the displacement field.

44. A computer program product as defined in claim 43 in which said dominant translation generator module is configured to enable the computer to generate the dominant translation ($u_D, v_D$) (where $u_D$ and $v_D$ correspond to horizontal and vertical dominant translation components) to correspond to the translation that minimizes $$\sum_R (A_0(x,y) - B_c(x+u_D, y+v_D))^2$$

where $A_0(x,y)$ corresponds to an intensity map for the one of said images relative to which the common coordinate system is defined and $B_0(x+u_D, y+v_D)$ correspond to an intensity map for said at least one of the other images of the image set from which a reconstruction relative to another reconstruction coordinate system was generated.

45. A computer program product as defined in claim 44 in which said dominant translation generator module is configured to enable the computer to generate the dominant translation ($u_D, v_D$) (where $u_D$ and $v_D$ correspond to horizontal and vertical dominant translation components) to correspond to the translation that minimizes $$\sum_R (A_0(x,y) - B_c(x+u_D, y+y_D))^2$$

by solving $$\begin{bmatrix} \sum (B_{c_x})^2 & \sum B_{c_x} B_{c_y} \\ \sum B_{c_x} B_{c_y} & \sum (B_{c_y})^2 \end{bmatrix} \begin{bmatrix} u_D \\ v_D \end{bmatrix} = \begin{bmatrix} -\sum (A_0 - B_c) B_{c_x} \\ -\sum (A_0 - B_c) B_{c_y} \end{bmatrix}$$

where each sum is over respective regions of the respective images and where $B_{c_x}$ and $B_{c_y}$ represent the horizontal and vertical components, respectively, of the gradient of the intensity values for the at least one of the other images of the image set from which a reconstruction relative to another reconstruction coordinate system was generated.

46. A computer program product as defined in claim 45 in which the dominant translation generator module solves $$\begin{bmatrix} \sum (B_{c_x})^2 & \sum B_{c_x} B_{c_y} \\ \sum B_{c_x} B_{c_y} & \sum (B_{c_y})^2 \end{bmatrix} \begin{bmatrix} u_D \\ v_D \end{bmatrix} = \begin{bmatrix} -\sum (A_0 - B_c) B_{c_x} \\ -\sum (A_0 - B_c) B_{c_y} \end{bmatrix}$$

for "$u_D$" and "$v_D$" using a Newton-Raphson iterative optimization technique.

47. A computer program product as defined in claim 43 in which the displacement field generator module is configured to enable the computer to generate the displacement field in relation to a pixel-to-pixel correspondence that corresponds to a translation that minimizes $$\sum_k (A_0(x,y) - B'_c(x+u_P, y+v_P))^2$$

where $A_0(x,y)$ represents an intensity map for the one of said images relative to which the common coordinate system is defined and $B'_c(x+u_P, y+v_P)$ represents an intensity map of the shifted image, "x" and "y" represent coordinates of the respective picture elements in the respective image and shifted image, and "k" represents a window around the respective pixel at location (x,y).

48. A computer program product as defined in claim 47 in which the window is a five pixel by five pixel window.

49. A computer program product as defined in claim 48 in which the displacement field generator module is configured to enable the computer to generate the displacement field that minimizes $$\sum_k (A_0(x,y) - B'_c(x+u_P, y+v_P))^2$$

by solving $$\begin{bmatrix} \sum (B'_{c_x})^2 & \sum B'_{c_x}B'_{c_y} \\ \sum B'_{c_x}B'_{c_y} & \sum (B'_{c_y})^2 \end{bmatrix} \begin{bmatrix} u_P \\ v_P \end{bmatrix} = \begin{bmatrix} -\sum (A_0 - B'_c)B'_{c_x} \\ -\sum (A_0 - B'_c)B'_{c_y} \end{bmatrix}$$

for each pixel location (x,y), where each sum is over the pixels in the window, to generate values for "$u_P$" and "$v_P$" for each location (x,y).

50. A computer program product as defined in claim 49 in which said displacement field generator module is configured to enable the computer to solve $$\begin{bmatrix} \sum (B'_{c_x})^2 & \sum B'_{c_x}B'_{c_y} \\ \sum B'_{c_x}B'_{c_y} & \sum (B'_{c_y})^2 \end{bmatrix} \begin{bmatrix} u_P \\ v_P \end{bmatrix} = \begin{bmatrix} -\sum (A_0 - B'_c)B'_{c_x} \\ -\sum (A_0 - B'_c)B'_{c_y} \end{bmatrix}$$

to generate values for "$u_P$" and "$v_P$" for each location (x,y) using a Newton-Raphson optimization technique.

51. A computer program product as defined in claim 50 in which said displacement field generator module is configured to enable the computer to solve $$\begin{bmatrix} \sum (B'_{c_x})^2 & \sum B'_{c_x}B'_{c_y} \\ \sum B'_{c_x}B'_{c_y} & \sum (B'_{c_y})^2 \end{bmatrix} \begin{bmatrix} u_P \\ v_P \end{bmatrix} = \begin{bmatrix} -\sum (A_0 - B'_c)B'_{c_x} \\ -\sum (A_0 - B'_c)B'_{c_y} \end{bmatrix}$$

to generate values for "$u_P$" and "$v_P$" for each location (x,y) in a series of iterations.

52. A computer program product as defined in claim 51 in which the displacement field generator module is configured to enable the computer to perform the iterations hierarchically in a coarse-to-fine manner.

53. A computer program product as defined in claim 43 in which translational and rotational coordinate value generator module is configured to enable the computer to generate the values for the translational and rotational components so as to minimize $$\sum_j \|RP_j + t - Q_j\|^2$$

where "R" represents the rotational component, "t" represents the translational component and "$P_j$" and "$Q_j$" represent corresponding points in the respective common and reconstruction coordinate systems.

54. A computer program product as defined in claim 41, the system stitching a plurality of reconstructions of three-dimensional surface features of at least one object in a scene, each reconstruction generated from an image set comprising a plurality of two-dimensional images of the scene, each reconstruction further being defined relative to a respective one of a plurality of reconstruction coordinate systems defined relative to one of the images in the respective image set, the reconstruction-to-common coordinate relation generator module being configured to enable the computer to generate transformations, each comprising a value for the translational and rotational component, using a maximum likelihood methodology.

55. A computer program product as defined in claim 54 in which, in accordance with the maximum likelihood methodology, the reconstruction-to-common coordinate relation generator module is configured to enable the computer to perform at least one iteration including an estimation phase in which it generates a new maximum likelihood estimate for coordinates of respective points in the scene and a maximum phase in which it generates re-estimations for each of the transformations.

56. A computer program product as defined in claim 55 in which the reconstruction-to-common coordinate relation generator module is configured to enable the computer to, during the estimation phase of each iteration, generate a new maximum likelihood estimate of coordinates of respective points in the scene, identified as $\hat{q}_j(S_0)$, as $$\hat{q}_j(S_0) = \frac{1}{m}\sum_{i=1}^{m} S_{0i}^{-1}(p_{ij}) \quad j = 1, \ldots, n \tag{59}$$

where "$S_0$" represents, for the first iteration, an initial set of transformations $S_0 = \{S_{01}, \ldots, S_{0m}\}$, and, for each subsequent iteration, a corresponding set of transformations as determined during the previous iteration, and $S_{0i}^{-1}(p_{ij})$ represents the inverse transformation for point $p_{ij}$ in the scene under the respective transformation $S_{0i}$.

57. A computer program product as defined in claim 55 in which the reconstruction-to-common coordinate relation generator module is configured to enable the computer to, during the maximum phase, generate a re-estimation for each transformation $S_i = (A_i, b_i)$, where "$A_i$" represents a rotation matrix and "$b_i$" represents an affine depth value, generate a covariance matrix $H_i$ as $$H_i = \frac{1}{n}\sum_{j=1}^{n}(\hat{q}(S_0) - \bar{q}(S_0))(p_{ij} - \bar{p}_i)^T \quad i = 1, \ldots, m$$

where $$\bar{q}(S_0) = \frac{1}{n}\sum_{j=1}^{n}\hat{q}_j(S_0)$$

and $$\bar{p}_i = \frac{1}{n}\sum_{j=1}^{n} p_{ij} \quad i = 1, \ldots, m$$

and to generate a re-estimation of the rotation matrix $A_i$ as $$A_i V_i U_i^T$$

where $U_i D_i V_i^T$ represents a singular value decomposition ("SVD") of the covariance matrix $H_i$, and to generate the re-estimation of the affine displacement vector $b_i$ as $$b_i = \bar{p}_i - A_i \bar{q}(S_0)$$

for i=1, . . . , m.

* * * * *